(12) United States Patent
Tomonari et al.

(10) Patent No.: US 11,728,712 B2
(45) Date of Patent: Aug. 15, 2023

(54) MAGNET TEMPERATURE INFORMATION OUTPUT DEVICE AND ROTATING ELECTRICAL MACHINE

(71) Applicant: TDK Corporation, Tokyo (JP)

(72) Inventors: Toshio Tomonari, Tokyo (JP); Noritaka Chiyo, Tokyo (JP); Koji Mitake, Tokyo (JP); Toshihiro Kuroshima, Tokyo (JP)

(73) Assignee: TDK Corporation, Tokyo (JP)

( * ) Notice: Subject to any disclaimer, the term of this patent is extended or adjusted under 35 U.S.C. 154(b) by 288 days.

(21) Appl. No.: 17/005,909

(22) Filed: Aug. 28, 2020

(65) Prior Publication Data

US 2021/0067010 A1    Mar. 4, 2021

(30) Foreign Application Priority Data

Sep. 4, 2019 (JP) .................. 2019-161097

(51) Int. Cl.
| | |
|---|---|
| *H02K 11/25* | (2016.01) |
| *G01K 7/36* | (2006.01) |
| *G01K 7/16* | (2006.01) |
| *H02K 21/14* | (2006.01) |

(52) U.S. Cl.
CPC .............. *H02K 11/25* (2016.01); *G01K 7/16* (2013.01); *G01K 7/36* (2013.01); *H02K 21/14* (2013.01)

(58) Field of Classification Search
CPC ........ H02K 11/00; H02K 11/25; H02K 11/33; H02K 21/00; H02K 21/14; G01K 7/00; G01K 7/16; G01K 7/24; G01K 7/245; G01K 7/36; G01K 1/00; G01K 1/02; G01K 1/024; G01K 13/00; G01K 13/08
See application file for complete search history.

(56) References Cited

FOREIGN PATENT DOCUMENTS

| | | | | |
|---|---|---|---|---|
| GB | 1359574 | A | * | 7/1974 |
| JP | 61039517 | B2 | * | 9/1986 |
| JP | S62-104453 | A | | 5/1987 |
| JP | 62104122 | U | * | 7/1987 |
| JP | 2000-134842 | A | | 5/2000 |
| JP | 5895578 | B2 | | 3/2016 |
| JP | 2017-028803 | A | | 2/2017 |

* cited by examiner

*Primary Examiner* — Tran N Nguyen
(74) *Attorney, Agent, or Firm* — Faegre Drinker Biddle & Reath LLP

(57) ABSTRACT

A magnet temperature information output device is disposed on a rotating electrical machine including a stator and a rotor with a permanent magnet, and is arranged to output temperature information regarding a temperature of the permanent magnet. The magnet temperature information output device includes an element arranged to detect a magnetic flux and output an electrical signal responding to the detected magnetic flux as the temperature information. The element is disposed on the stator.

4 Claims, 4 Drawing Sheets

MAGNET TEMPERATURE INFORMATION OUTPUT DEVICE AND ROTATING ELECTRICAL MACHINE

BACKGROUND OF THE INVENTION

1. Field of the Invention

One aspect of the present invention relates to a magnet temperature information output device. Another aspect of the present invention relates to a rotating electrical machine having a magnet temperature information output device.

2. Description of Related Art

Known rotating electrical machines include a stator and a rotor with a permanent magnet (for example, see Japanese Unexamined Patent Publication No. 2000-134842).

SUMMARY OF THE INVENTION

In general, in cases where the rotating electrical machine is driven, a temperature of the permanent magnet rises. In cases where a magnetic field change is given to the permanent magnet in a state in which the temperature of the permanent magnet is equal to or higher than a predetermined temperature, the permanent magnet may be demagnetized. Temperature information regarding the temperature of the permanent magnet tends not to be acquired accurately because the permanent magnet is disposed on the rotor. Therefore, when designing the rotating electrical machine, an over-spec magnet having high heat resistance may be selected on the assumption that the temperature of the permanent magnet becomes equal to or higher than the predetermined temperature.

In contrast, a configuration is conceivable in which temperature information regarding the temperature of the permanent magnet is acquired to control a drive state of the rotating electrical machine so that the permanent magnet does not reach the predetermined temperature. The permanent magnet is disposed on the rotor. Therefore, for example, even in a case where a configuration is adopted in which a temperature sensor for detecting the temperature of the permanent magnet is disposed on the rotor, temperature information regarding the temperature of the permanent magnet tends not to be output appropriately and simply.

An object of one aspect of the present invention is to provide a magnet temperature information output device that outputs temperature information regarding a temperature of a permanent magnet disposed on a rotor appropriately and simply. An object of another aspect of the present invention is to provide a rotating electrical machine that outputs temperature information regarding a temperature of a permanent magnet disposed on a rotor appropriately and simply.

A magnet temperature information output device according to one aspect is disposed on a rotating electrical machine including a stator and a rotor with a permanent magnet, and is arranged to output temperature information regarding a temperature of the permanent magnet. The magnet temperature information output device includes an element arranged to detect a magnetic flux and output an electrical signal responding to the detected magnetic flux as the temperature information. The element is disposed on the stator.

In the one aspect, the element disposed on the stator detects the magnetic flux, and outputs the electrical signal responding to the detected magnetic flux as the temperature information. Therefore, in the one aspect, the magnet temperature information output device outputs the temperature information regarding the temperature of the permanent magnet disposed on the rotor appropriately and simply.

A rotating electrical machine according to another aspect includes a stator, a rotor with a permanent magnet, and a magnet temperature information output device arranged to output temperature information regarding a temperature of the permanent magnet. The magnet temperature information output device includes an element arranged to detect a magnetic flux and output an electrical signal responding to the detected magnetic flux as the temperature information. The element is disposed on the stator.

The other aspect includes the magnet temperature information output device. The element disposed on the stator detects the magnetic flux, and outputs the electrical signal responding to the detected magnetic flux as the temperature information. Therefore, the other aspect outputs the temperature information regarding the temperature of the permanent magnet disposed on the rotor appropriately and simply.

The magnet temperature information output device may include a temperature sensor disposed on the rotor and a first coil disposed on the rotor. In this case, the temperature sensor is arranged such that an electrical resistance of the temperature sensor changes in response to the temperature of the permanent magnet, and the first coil is electrically connected to the temperature sensor. The element may include a second coil and an electric-current sensor. In this case, the second coil is arranged to excite the first coil, and the electric-current sensor is arranged to output an electrical signal responding to a magnitude of a current flowing through the second coil.

Electric power is supplied to the first coil due to exciting the first coil by the second coil. The current flowing through the second coil changes in response to the change in the electrical resistance of the temperature sensor because the electrical resistance of the temperature sensor electrically connected to the first coil changes in response to the temperature of the permanent magnet. The electric-current sensor outputs an electrical signal responding to the magnitude of the current flowing through the second coil. Therefore, the electrical signal output from the electric-current sensor changes in response to the temperature of the permanent magnet. Consequently, even in a configuration in which the temperature sensor is disposed on the rotor, the element outputs the temperature information regarding the temperature of the permanent magnet more appropriately and simply.

The magnet temperature information output device may include a capacitor that forms an LC resonance circuit together with the first coil. In this case, the capacitor is disposed on the rotor.

The element may include a magnetic sensor arranged to detect a magnetic flux of the permanent magnet.

In a case where the element includes a magnetic sensor, the magnet temperature information output device that outputs the temperature information regarding the temperature of the permanent magnet appropriately and simply is easily constituted.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
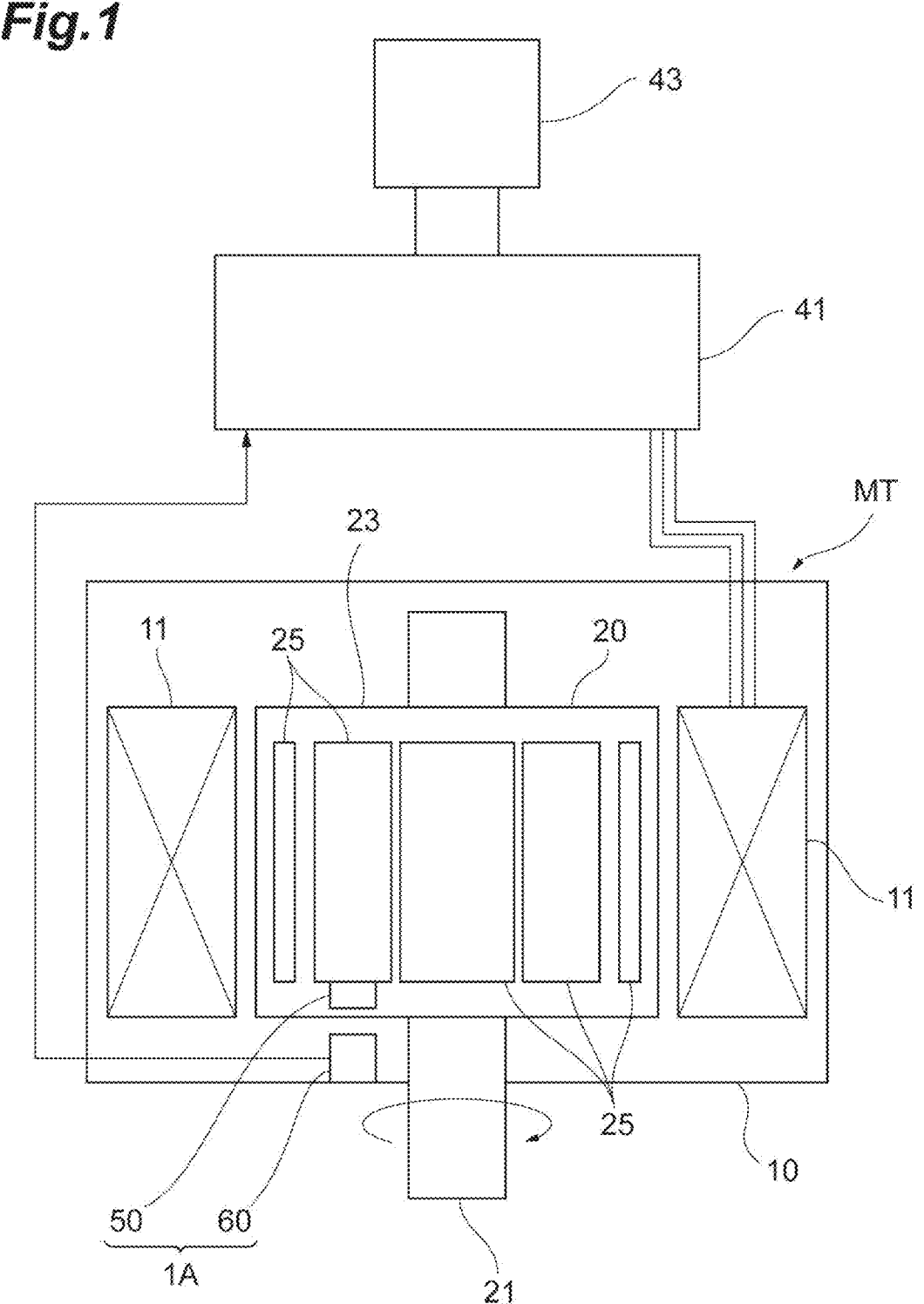
FIG. 1 is a schematic view illustrating a configuration of a magnet temperature information output device according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
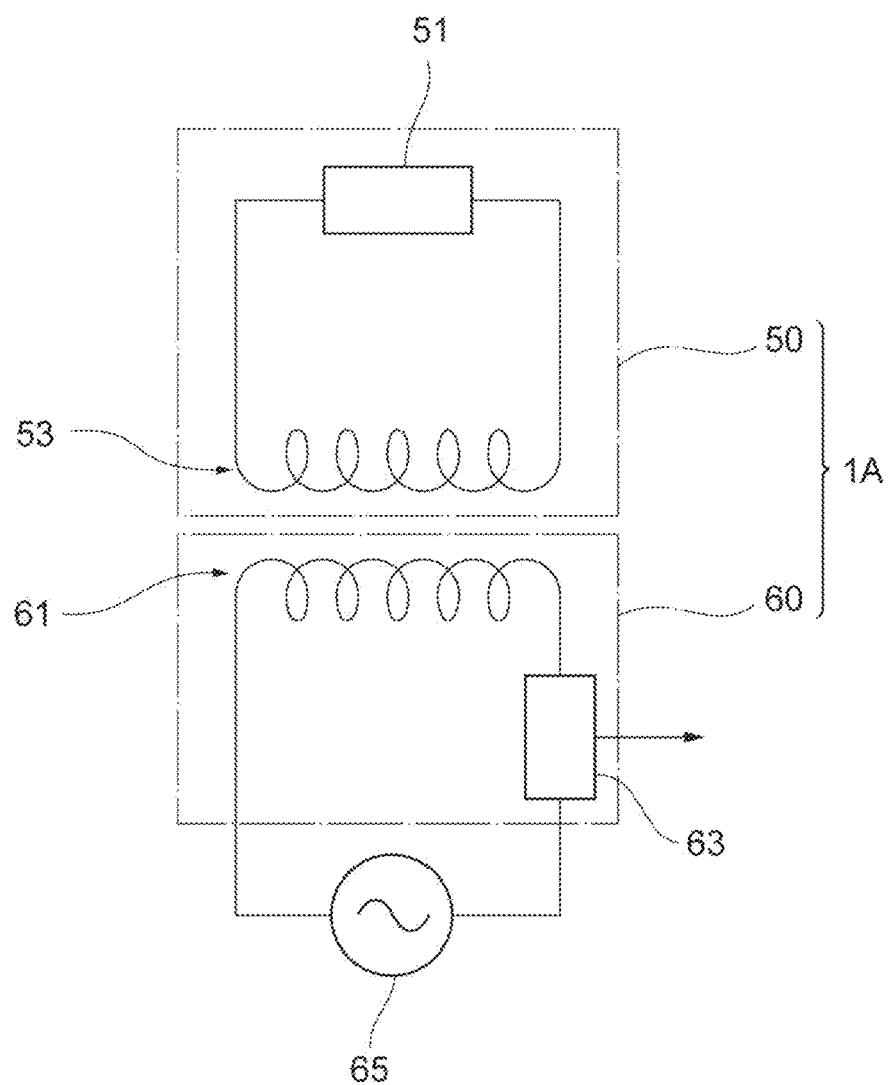
FIG. 2 is a circuit diagram illustrating an example of the magnet temperature information output device.

A configuration of a magnet temperature information output device 1A according to an embodiment will be described with reference to FIGS. 1 and 2. FIG. 1 is a schematic view illustrating the configuration of the magnet temperature information output device according to the embodiment. FIG. 2 is a circuit diagram illustrating an example of the magnet temperature information output device.

As illustrated in FIG. 1, the magnet temperature information output device 1A is disposed on a rotating electrical machine MT. That is, the rotating electrical machine MT includes the magnet temperature information output device 1A. The rotating electrical machine MT is, for example, a motor. Examples of a motor include an IPM motor and an SPM motor. The rotating electrical machine MT includes a stator 10 and a rotor 20. The rotor 20 is located inside the stator 10.

The rotor 20 includes a shaft 21, a rotor core 23, and a plurality of permanent magnets 25. The shaft 21 has a columnar shape. The rotor core 23 has a cylindrical shape. A shaft hole into which the shaft 21 is fitted is formed in the rotor core 23. The shaft 21 and the rotor core 23 rotate integrally around a central axis of the shaft 21. Each permanent magnet 25 is disposed on the rotor core 23 such that an extension direction of each permanent magnet 25 is parallel to the central axis of the shaft 21. The extension direction of each permanent magnet 25 is approximately parallel to the central axis of the shaft 21. The central axis of the shaft 21 is a rotation axis of the rotor 20. A direction in which the rotation axis of the rotor 20 extends is the rotation axis direction of the rotor 20. The plurality of permanent magnets 25 are disposed at equal angle intervals with respect to the rotation axis of the rotor 20.

In a case where the rotating electrical machine MT is an IPM motor, the plurality of permanent magnets 25 are disposed in the rotor core 23. In a case where the rotating electrical machine MT is an SPM motor, the plurality of permanent magnets 25 are disposed on the surface of the rotor core 23. Each permanent magnet 25 includes a rare earth-based permanent magnet. Each permanent magnet 25 is, for example, a neodymium-based sintered magnet. Each permanent magnet 25 may be a sintered magnet other than the rare earth-based permanent magnet, or may be a magnet other than the sintered magnet. Examples of a magnet other than the sintered magnet include a bonded magnet and a hot pressed magnet.

The stator 10 includes a cylindrical stator core (not illustrated) and a plurality of coils 11. The stator core is disposed to surround an outer periphery of the rotor 20. An air gap having a uniform width is formed between the stator 10 and the rotor 20. The stator core holds the plurality of coils 11. Each coil 11 is disposed on an inner peripheral side of the stator core. The plurality of coils 11 are disposed at equal angle intervals with respect to the rotation axis of the rotor 20.

The rotating electrical machine MT is connected to a control circuit 41. The control circuit 41 is connected to a power supply 43. The control circuit 41 adjusts a drive current from the power supply 43, and supplies a three-phase AC current to each coil 11. The control circuit 41 controls a value of the three-phase AC current supplied to each coil 11. The control circuit 41 includes, for example, an inverter circuit. Each coil 11 forms a rotating magnetic field for rotating the rotor 20 due to supplying the three-phase AC current to each coil 11. The power supply 43 includes, for example, an electrical energy storage device. Examples of the electrical energy storage device include a secondary battery and a capacitor.

The magnet temperature information output device 1A includes a first element 50 and a second element 60. In the embodiment, the number of first elements 50 is one, and the number of second elements 60 is also one. The first element 50 is disposed on the rotor 20. The second element 60 is disposed on the stator 10. The second element 60 is disposed on the stator core, for example. The magnet temperature information output device 1A outputs temperature information regarding a temperature of the permanent magnet 25. The first element 50 and the second element 60 are disposed to oppose each other in a direction approximately parallel to the rotation axis of the rotor 20 in a state where the rotor 20 is at a predetermined rotation angle position.

As illustrated in FIG. 2, the first element 50 includes a temperature sensor 51 and a coil 53. The temperature sensor 51 and the coil 53 are disposed on the rotor 20. The temperature sensor 51 is disposed on at least one permanent magnet 25 of the plurality of permanent magnets 25. In the embodiment, the temperature sensor 51 is disposed on only one permanent magnet 25. The temperature sensor 51 is disposed to be in contact with the permanent magnet 25. The temperature sensor 51 may be disposed in a vicinity of the permanent magnet 25. The electrical resistance of the temperature sensor 51 changes in response to the temperature of the permanent magnet 25. The electrical resistance of the temperature sensor 51 decreases as the temperature of the permanent magnet 25 rises. The temperature sensor 51 includes, for example, a thermistor. The temperature sensor 51 includes, for example, an NTC thermistor. The coil 53 is electrically connected to the temperature sensor 51. Both ends of the coil 53 are electrically connected to both ends of the temperature sensor 51.

The second element 60 includes a coil 61 and an electric-current sensor 63. The coil 61 is disposed on the stator 10 (stator core) to oppose the coil 53 in a state where the rotor 20 is at a predetermined rotation angle position. An AC power supply 65 is electrically connected to the coil 61. An AC signal (AC voltage) having a predetermined frequency from the AC power supply 65 is applied to the coil 61. The electric-current sensor 63 outputs an electrical signal responding to a magnitude of a current flowing through the coil 61. The electric-current sensor 63 includes, for example, an AC current sensor. For example, in a case where the coil 53 constitutes a first coil, the coil 61 constitutes a second coil. The predetermined frequency is higher than a drive frequency of the rotating electrical machine MT. The predetermined frequency is, for example, 10 to 200 times the drive frequency of the rotating electrical machine MT.

A magnetic flux responding to the AC voltage applied from the AC power supply 65 is generated in the coil 61. When the rotor 20 rotates and the coil 61 and the coil 53 come close to each other, the magnetic flux generated in the coil 61 passes through the coil 53. When the magnetic flux generated in the coil 61 passes through the coil 53, electric power responding to the magnetic flux passing through the coil 53 is generated in the coil 53. That is, the coil 61 excites the coil 53 to supply the electric power to the coil 53.

The electrical resistance of the temperature sensor 51 changes in response to the temperature of the permanent magnet 25. The magnetic flux generated in the coil 61 changes in response to the change in the electrical resistance of the temperature sensor 51. Therefore, the current flowing through the coil 61 changes. As the temperature of the permanent magnet 25 rises and the electrical resistance of the temperature sensor 51 decreases, the magnetic flux generated in the coil 61 increases. Therefore, the current flowing through the coil 61 increases. As the temperature of the permanent magnet 25 drops and the electrical resistance of the temperature sensor 51 increases, the magnetic flux generated in the coil 61 decreases. Therefore, the current flowing through the coil 61 decreases.

The electric-current sensor 63 detects the magnetic flux generated in the coil 61 as a change in the current flowing through the coil 61. That is, the electric-current sensor 63 indirectly detects the magnetic flux generated in the coil 61. The change in the current detected by the electric-current sensor 63 corresponds to a change in the electrical resistance of the temperature sensor 51, that is, a change in the temperature of the permanent magnet 25. Therefore, an electrical signal output from the electric-current sensor 63, that is, an output signal of the electric-current sensor 63 includes temperature information regarding the temperature of the permanent magnet 25. The second element 60 indirectly detects the generated magnetic flux, and outputs an electrical signal responding to the indirectly detected magnetic flux as the temperature information. Consequently, information regarding the temperature of the permanent magnet 25 is wirelessly transmitted between the first element 50 and the second element 60.

The electrical signal output from the electric-current sensor 63 is input to the control circuit 41. The control circuit 41 controls a drive state of the rotating electrical machine MT based on the electrical signal output from the electric-current sensor 63. For example, the control circuit 41 controls the drive state of the rotating electrical machine MT as follows. In a case where the control circuit 41 determines that the electrical signal output from the electric-current sensor 63 indicates that the temperature of the permanent magnet 25 has risen to a predetermined first threshold value, the control circuit 41 controls a supply electric power in such a manner as to limit a rotation speed of the rotating electrical machine MT. In a case where the control circuit 41 determines that the electrical signal output from the electric-current sensor 63 indicates that the temperature of the permanent magnet 25 has dropped to a predetermined second threshold value, the control circuit 41 controls the supply electric power in such a manner as to release a limitation on the rotation speed of the rotating electrical machine MT. In this case, the second threshold value is less than the first threshold value, for example.

The control circuit 41 may control the drive state of the rotating electrical machine MT as follows. That is, the control circuit 41 may control the drive frequency input to the rotating electrical machine MT, for example. In a case where the control circuit 41 determines that the electrical signal output from the electric-current sensor 63 indicates that the temperature of the permanent magnet 25 has risen to a predetermined first threshold value, the control circuit 41 controls to decrease the drive frequency in such a manner as to limit the rotation speed of the rotating electrical machine MT. In a case where the control circuit 41 determines that the electrical signal output from the electric-current sensor 63 indicates that the temperature of the permanent magnet 25 has dropped to a predetermined second threshold value, the control circuit 41 controls to increase the drive frequency in such a manner as to release a limitation on the rotation speed of the rotating electrical machine MT. Also in this case, the second threshold value is less than the first threshold value, for example.

As described above, in the magnet temperature information output device 1A, the second element 60 disposed on the stator 10 detects the magnetic flux, and outputs the electrical signal responding to the detected magnetic flux as the temperature information. Therefore, the magnet temperature information output device 1A outputs the temperature information regarding the temperature of the permanent magnet 25 disposed on the rotor 20 appropriately and simply.

The rotating electrical machine MT includes the magnet temperature information output device 1A. Therefore, the rotating electrical machine MT outputs the temperature information regarding the temperature of the permanent magnet disposed on the rotor 20 appropriately and simply.

The magnet temperature information output device 1A includes the first element 50 including the temperature sensor 51 and the coil 53. The second element 60 includes the coil 61 and the electric-current sensor 63.

The electric power is supplied to the coil 53 due to exciting the coil 53 by the coil 61. The current flowing through the coil 61 changes in response to the change in the electrical resistance of the temperature sensor 51 because the electrical resistance of the temperature sensor 51 changes in response to the temperature of the permanent magnet 25. The electric-current sensor 63 outputs the electrical signal responding to the magnitude of the current flowing through the coil 61. Therefore, the electrical signal output from the electric-current sensor 63 changes in response to the temperature of the permanent magnet 25. Consequently, even in a configuration in which the temperature sensor 51 is disposed on the rotor 20, the second element 60 outputs the temperature information regarding the temperature of the permanent magnet 25 more appropriately and simply.

The first element 50 and the second element 60 are disposed to oppose each other in the direction approximately parallel to the rotation axis of the rotor 20 in a state where the rotor 20 is at the predetermined rotation angle position. In this case, the magnetic flux generated in the coils 11 tends not to affect the coils 53 and 61.

Figure 4:
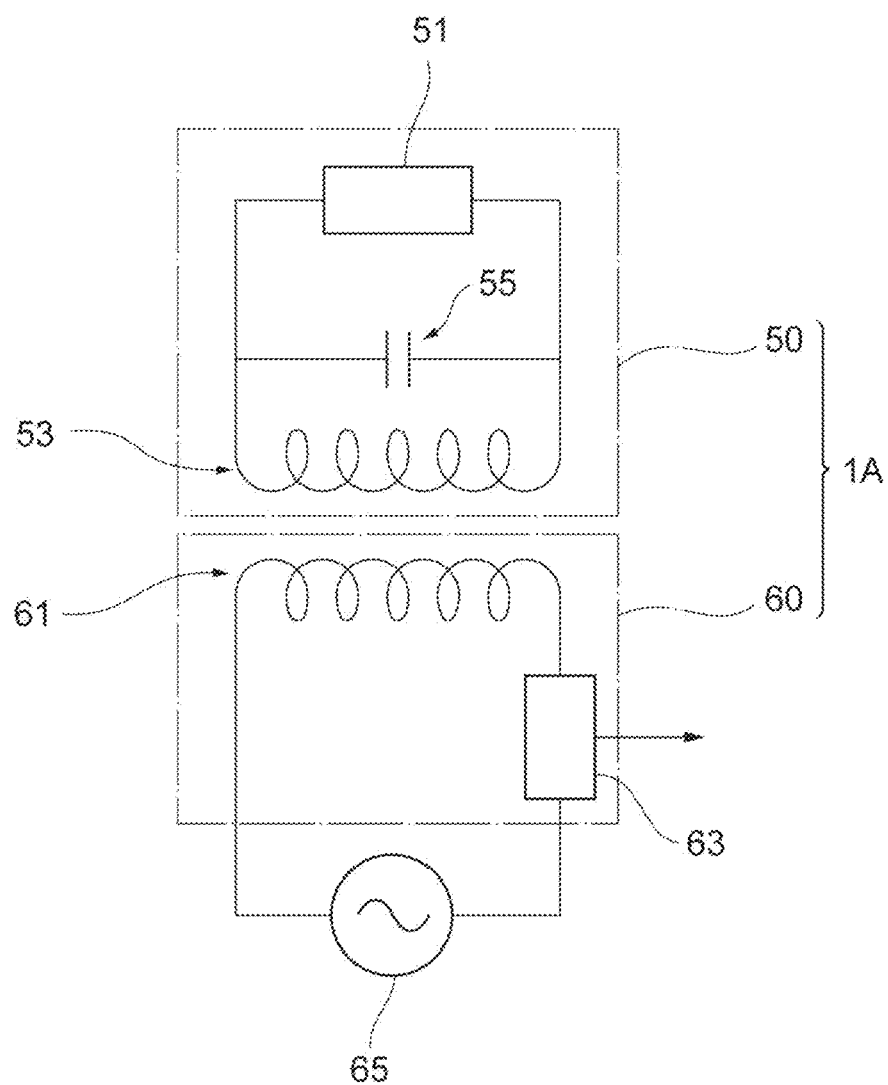
FIG. 4 is a circuit diagram illustrating another example of the magnet temperature information output device.

As illustrated in FIG. 4, the first element 50 may include a capacitor 55. FIG. 4 is a circuit diagram illustrating another example of the magnet temperature information output device. The capacitor 55 is disposed on the rotor 20. The coil 53 and the capacitor 55 form an LC resonance circuit. The capacitor 55 is inserted to be connected in parallel to the coil 53, for example. The configuration in which the first element 50 includes the capacitor 55 senses the change of the temperature sensor 51 more sensitively.

As a configuration for acquiring the output signal of the temperature sensor 51 disposed on the rotor 20, the following configuration is considered. A transmitter arranged to transmit the output signal of the temperature sensor 51 is disposed on the rotor 20, and a receiver arranged to receive a signal from the transmitter is disposed on the stator 10. This configuration prevents the rotating electrical machine MT from being miniaturized because a transmitter needs to be disposed on the rotor 20. Additionally, a configuration of the rotating electrical machine MT is complicated because it is necessary to construct a path to supply electric power to the transmitter.

In contrast, the magnet temperature information output device 1A tends not to prevent the rotating electrical machine MT from being miniaturized, and tends not to complicate the configuration of the rotating electrical machine MT.

Figure 3:
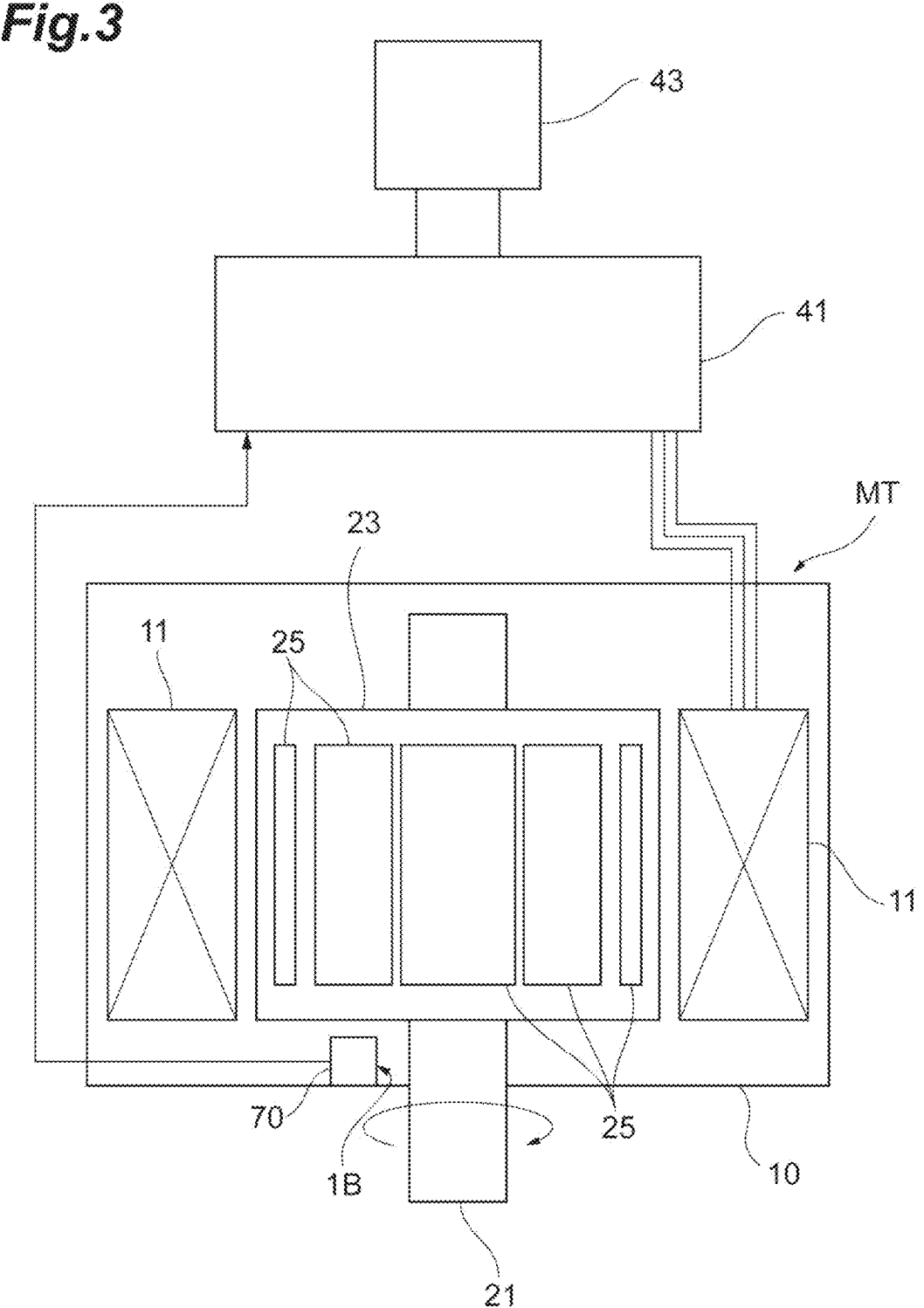
FIG. 3 is a schematic view illustrating a configuration of a magnet temperature information output device according to a modification of the embodiment.

Next, a configuration of a magnet temperature information output device 1B according to a modification of the embodiment will be described with reference to FIG. 3. FIG. 3 is a schematic view illustrating the configuration of the magnet temperature information output device according to the modification.

As illustrated in FIG. 3, the magnet temperature information output device 1B is disposed on the rotating electrical machine MT. That is, the rotating electrical machine MT includes the magnet temperature information output device 1B. The magnet temperature information output device 1B includes an element 70. In the modification, the number of elements 70 is one. The element 70 is disposed on the stator 10. The element 70 is disposed on the stator core, for example. Similar to the magnet temperature information output device 1A, the magnet temperature information output device 1B outputs temperature information regarding the temperature of the permanent magnet 25.

The element 70 includes a magnetic sensor arranged to detect the magnetic flux of the permanent magnet 25. That is, the magnetic sensor detects the magnetic flux of the permanent magnet 25. The element 70 is disposed on the stator 10 (stator core) to be closest to the permanent magnet 25 in a state where the rotor 20 is at a predetermined rotation angle position. The element 70 may be disposed on the stator 10 (stator core) to oppose the permanent magnet 25 in a state where the rotor 20 is at a predetermined rotation angle position. The element 70 and the permanent magnet 25 are disposed to oppose each other in a direction approximately parallel to the rotation axis of the rotor 20 in a state where the rotor 20 is at the predetermined rotation angle position. Examples of the element 70 include a Hall element and a magnetoresistive element.

The element 70 directly detects the magnetic flux of the permanent magnet 25. In the permanent magnet 25, the magnetic flux generated decreases as the temperature of the permanent magnet 25 rises. The change in the magnetic flux of the permanent magnet 25 detected by the element 70 corresponds to the change in the temperature of the permanent magnet 25. Therefore, an electrical signal output from the element 70, that is, an output signal of the element 70 includes temperature information regarding the temperature of the permanent magnet. The element 70 directly detects the magnetic flux generated from the permanent magnet 25, and outputs an electrical signal responding to the directly detected magnetic flux as the temperature information.

The electrical signal output from the element 70 is input to the control circuit 41. The control circuit 41 controls the drive state of the rotating electrical machine MT based on the electrical signal output from the element 70. For example, the control circuit 41 controls the drive state of the rotating electrical machine MT as follows. In a case where the control circuit 41 determines that the electrical signal output from the element 70 indicates that the temperature of the permanent magnet 25 has risen to a predetermined first threshold value, the control circuit 41 controls the supply electric power in such a manner as to limit the rotation speed of the rotating electrical machine MT. In a case where the control circuit 41 determines that the electrical signal output from the element 70 indicates that the temperature of the permanent magnet 25 has dropped to a predetermined second threshold value, the control circuit 41 controls the supply electric power in such a manner as to release the limitation on the rotation speed of the rotating electrical machine MT.

As described above, in the magnet temperature information output device 1B, the element 70 disposed on the stator 10 detects the magnetic flux, and outputs the electrical signal responding to the detected magnetic flux as the temperature information. Therefore, the magnet temperature information output device 1B outputs the temperature information regarding the temperature of the permanent magnet 25 appropriately and simply.

The element 70 includes a magnetic sensor. Therefore, the magnet temperature information output device 1B that outputs the temperature information appropriately and simply is easily constituted.

Similar to the magnet temperature information output device 1A, the magnet temperature information output device 1B tends not to prevent the rotating electrical machine MT from being miniaturized, and tends not to complicate the configuration of the rotating electrical machine MT.

The rotating electrical machine MT includes the magnet temperature information output device 1B. Therefore, the rotating electrical machine MT outputs the temperature information regarding the temperature of the permanent magnet disposed on the rotor appropriately and simply.

Although the embodiment and modifications of the present invention have been described above, the present invention is not necessarily limited to the embodiment and modifications, and the embodiment can be variously changed without departing from the scope of the invention.

The number of first elements 50 may be plural. For example, the number of first elements 50 may be the same as the number of permanent magnets 25. Even in this case, the number of second elements 60 may be one.

The number of elements 70 may be plural. For example, the number of elements 70 may be the same as the number of permanent magnets 25.

What is claimed is:

1. A magnet temperature information output device that is disposed on a rotating electrical machine including a stator and a rotor with a permanent magnet and is arranged to output temperature information regarding a temperature of the permanent magnet, the device comprising:
    a first element comprising:
        a temperature sensor that is disposed on the rotor and is arranged such that an electrical resistance of the temperature sensor changes in response to the temperature of the permanent magnet; and a first coil that is disposed on the rotor and is electrically connected to the temperature sensor, and a second element comprising:
- a second coil that is disposed on the stator and is arranged to excite the first coil; and
- an electric-current sensor that is disposed on the stator and is arranged to output an electrical signal responding to a magnitude of a current flowing through the second coil and indirectly detect a magnetic flux generated in the second coil, the second element being arranged to detect the magnetic flux generated in the second coil and output the electrical signal as the temperature information.

2. The magnet temperature information output device according to claim 1, the first element further comprising:
- a capacitor that is disposed on the rotor and forms an LC resonance circuit together with the first coil.

3. A rotating electrical machine, comprising:
- a stator;
- a rotor with a permanent magnet; and
- a magnet temperature information output device arranged to output temperature information regarding a temperature of the permanent magnet,
- wherein the magnet temperature information output device includes:
  - a first element comprising:
    - a temperature sensor that is disposed on the rotor and is arranged such that an electrical resistance of the temperature sensor changes in response to the temperature of the permanent magnet; and
    - a first coil that is disposed on the rotor and is electrically connected to the temperature sensor, and
  - a second element comprising:
    - a second coil that is disposed on the stator and is arranged to excite the first coil; and
    - an electric-current sensor that is disposed on the stator and is arranged to output an electrical signal responding to a magnitude of a current flowing through the second coil and indirectly detect a magnetic flux generated in the second coil, the second element being arranged to detect the magnetic flux generated in the second coil and output the electrical signal as the temperature information.

4. The rotating electrical machine according to claim 3, wherein the first element of the magnet temperature information output device further includes a capacitor that is disposed on the rotor and forms an LC resonance circuit together with the first coil.

* * * * *